US007782306B2

(12) United States Patent
Guo et al.

(10) Patent No.: US 7,782,306 B2
(45) Date of Patent: Aug. 24, 2010

(54) INPUT DEVICE AND METHOD OF CONFIGURING THE INPUT DEVICE

(75) Inventors: William Guo, Sammamish, WA (US); Richard S. Lum, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 147 days.

(21) Appl. No.: 10/434,673

(22) Filed: May 9, 2003

(65) Prior Publication Data

US 2004/0222963 A1 Nov. 11, 2004

(51) Int. Cl.
*G06F 3/02* (2006.01)
(52) U.S. Cl. ...................................... 345/172
(58) Field of Classification Search .......... 345/171, 345/172, 168, 169; 463/37
See application file for complete search history.

(56) References Cited

U.S. PATENT DOCUMENTS

| 4,531,119 | A | * | 7/1985 | Nakayama et al. ........ 345/171 |
| 5,759,100 | A | * | 6/1998 | Nakanishi ................. 463/37 |
| 5,874,906 | A | | 2/1999 | Willner et al. |
| 5,957,595 | A | * | 9/1999 | Chen ....................... 400/472 |
| 5,973,675 | A | * | 10/1999 | Joto et al. ................. 345/168 |
| 5,984,548 | A | | 11/1999 | Willner et al. |
| 6,071,194 | A | * | 6/2000 | Sanderson et al. ......... 463/37 |
| 6,288,709 | B1 | | 9/2001 | Willner et al. |
| 6,313,982 | B1 | * | 11/2001 | Hino ......................... 361/679 |
| 6,504,709 | B2 | * | 1/2003 | Yang et al. ................. 361/686 |
| 6,512,511 | B2 | | 1/2003 | Willner et al. |
| 6,798,359 | B1 | * | 9/2004 | Ivancic ...................... 341/23 |
| 2002/0039922 | A1 | * | 4/2002 | Nelson ....................... 463/37 |

(Continued)

FOREIGN PATENT DOCUMENTS

JP 02-226324 A 9/1990

(Continued)

OTHER PUBLICATIONS

"Reviews: ASCII Keyboard Controller;" Internet article printed from <http://www.planetgamecube.com/reviews.cfm?action=hwprofile&id=205>; date of first publication unknown, but believed prior to May 9, 2003.

(Continued)

*Primary Examiner*—Sumati Lefkowitz
*Assistant Examiner*—Ke Xiao
(74) *Attorney, Agent, or Firm*—Woodcock Washburn LLP

(57) ABSTRACT

A input device is disclosed that is configurable as a manufacturing step or by a user to input selected characters. The input device includes character input keys and an internal memory. The specific character that is input by activating one of the character input keys depends upon a configuration code that is stored within the internal memory. The configuration code is associated with a key mapping configuration of a host device, for example, and the configuration code may be associated with a plurality of character identifiers for the character input keys. When the input device is configured during manufacturing, the configuration code may be programmed into the internal memory and the character identifiers may be provided. When the input device is configured by the user, the configuration code and the character identifiers are replaced with an alternate configuration code character identifiers.

21 Claims, 12 Drawing Sheets

U.S. PATENT DOCUMENTS

2002/0051957 A1* 5/2002 Schwarzkopf ............... 434/227
2002/0186525 A1* 12/2002 Singh ......................... 361/680
2003/0149756 A1* 8/2003 Grieve et al. ................ 709/223

FOREIGN PATENT DOCUMENTS

JP            07-160392       6/1995

OTHER PUBLICATIONS

Two photographs of ASCII keyboard; date of publication unknown.
"AlphaGrip" web page <http://www.alphagrip.com>; date of first publication unknown, but believed to be prior to May 9, 2003.
Notice of Office Action dated Apr. 6, 2007 in Chinese Application No. 200410032451.
Office Action dated Oct. 23, 2009 from related JP application No. 2004-116085.
"Logicool Will Release on Jun. 13 'NetPlay Controller' for PlayStation with integrated a Keyboard and DUALSHOCK2", Impress Corporation, May 23, 2002, Available at: http://game.watchimpress.co.jp/docs/20020523/logicool.htm, Searched on Sep. 30, 2009.
"Sammy Will Release 'Keyboard Pad Mini' for PlayStation 2 for Using a Keyboard Without Releasing a Controller," Impress Corporation, Dec. 5, 2002, Available at: http://game.watch.impress.co.jp/docs/20021205/sammy.htm, Searched on Sep. 30, 2009.

* cited by examiner

INPUT DEVICE AND METHOD OF CONFIGURING THE INPUT DEVICE

BACKGROUND OF THE INVENTION

1. Field of the Invention

The present invention relates to a character input device for computer-related systems. The invention concerns, more particularly, a character input device that is configurable during the manufacturing process or by the user to have various character configurations. The invention has application to various peripheral input devices for computers and gaming systems.

2. Description of Background Art

Game controllers are frequently used with gaming and computer systems, for example. Controllers are normally designed to be hand-held, and commonly include a wide variety of user interaction mechanisms such as thumbsticks, D-pads, and various depressible buttons. Due to progressions in video game systems and data transfer capability, some games permit the input of text and other characters. Such text input is commonly performed on a typical, full size keyboard due to the quantity and number of keys used for inputting text.

Attempts have been made to integrate keys corresponding to alphabetic keys onto a hand-held game controller. However, such attempts have been less than satisfactory, as the size, number, and/or configuration of the keys and/or the methods of using the keys have not provided a solution that permits for efficient entry of a large number of letters and other characters without drawbacks.

A further limitation upon input devices having keys corresponding to alphabetic characters relates to the various locations, languages, and cultures for which the input devices are manufactured. Depending upon the location in which the input device is utilized, the language of the user, and the culture of the user, the various characters that are input by activating the keys may be substantially different. That is, the characters may be arranged differently, different characters may be available for input, and the input device will have different character identifiers on the exterior. Different assembly lines, therefore, may be required for producing input devices for different markets. Accordingly, an efficient manner of producing input devices for different markets is required.

SUMMARY OF THE INVENTION

The present invention is a character input device having a housing, a plurality of character input keys accessible from an exterior of the housing, and a rewritable memory device located within the housing and having a key mapping configuration area that stores a key mapping configuration for the character input keys. An advantage of this configuration is that the key mapping configuration may be reprogrammed to a new key mapping configuration that associates different characters with at least some of the character input keys. Furthermore, the character input device may be substantially manufactured without a key mapping configuration or with a default key mapping configuration. Then, depending upon the final destination of the character input device, a key mapping configuration may be programmed into the memory. Furthermore, the rewritability of the memory permits a user to adapt the character input device to the specific location, language, or culture of the user.

In another aspect of the invention, a character input device includes a plurality of character input keys, a plurality of first character identifiers, and an internal memory. The first character identifiers are associated with the character input keys, and the first character identifiers are replaceable with a plurality of second character identifiers. The internal memory has a first configuration code that corresponds with the first character identifiers. The internal memory is also reprogrammable to replace the first configuration code with a second configuration code that corresponds with the second character identifiers.

Another aspect of the invention is a method of manufacturing an input device. The method includes encasing a rewritable memory device within a housing of the input device. The method also includes programming a key mapping configuration into the input device after encasing the rewritable memory device within the housing.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

Introduction

The following discussion and accompanying figures disclose a character input device in accordance with the present invention. The character input device incorporates a plurality of keys that may be activated to input characters or perform other actions. The specific characters associated with the keys and the particular actions associated with each key may depend, for example, upon the location in which the character input device is being utilized, the language of the user, the culture of the user, or the preferences of the user. Accordingly, the character configuration associated with the input device is configurable either as a step in the manufacturing process or by the user.

An advantage of this structure is that the character input device may be substantially manufactured and then a character configuration may be assigned that is based upon the location, language, or culture of the intended user. Accordingly, character input devices may be manufactured in a substantially similar manner regardless of the final destination, and then a destination-specific character configuration may be imparted. This advantage also reduces the overall inventory of the manufacturer. As demand arises in a particular location, for example, a character configuration may be added to various character input devices to configure the character input devices for the location. Furthermore, the reconfigurability of the character input device permits a user to adapt the character input device to the specific location, language, or culture of the user.

The character input device and, more specifically, the operation of the character input device are disclosed with reference to a gaming system. The present invention, however, has application to a wide variety of products where character input is utilized, including personal computer systems and hand-held electronic devices, such as personal data assistants, for example. Accordingly, one skilled in the relevant art will recognize that the present invention may be applied to a variety of products, in addition to the specific applications related to gaming systems disclosed herein.

Exemplary Gaming System

Figure 1:
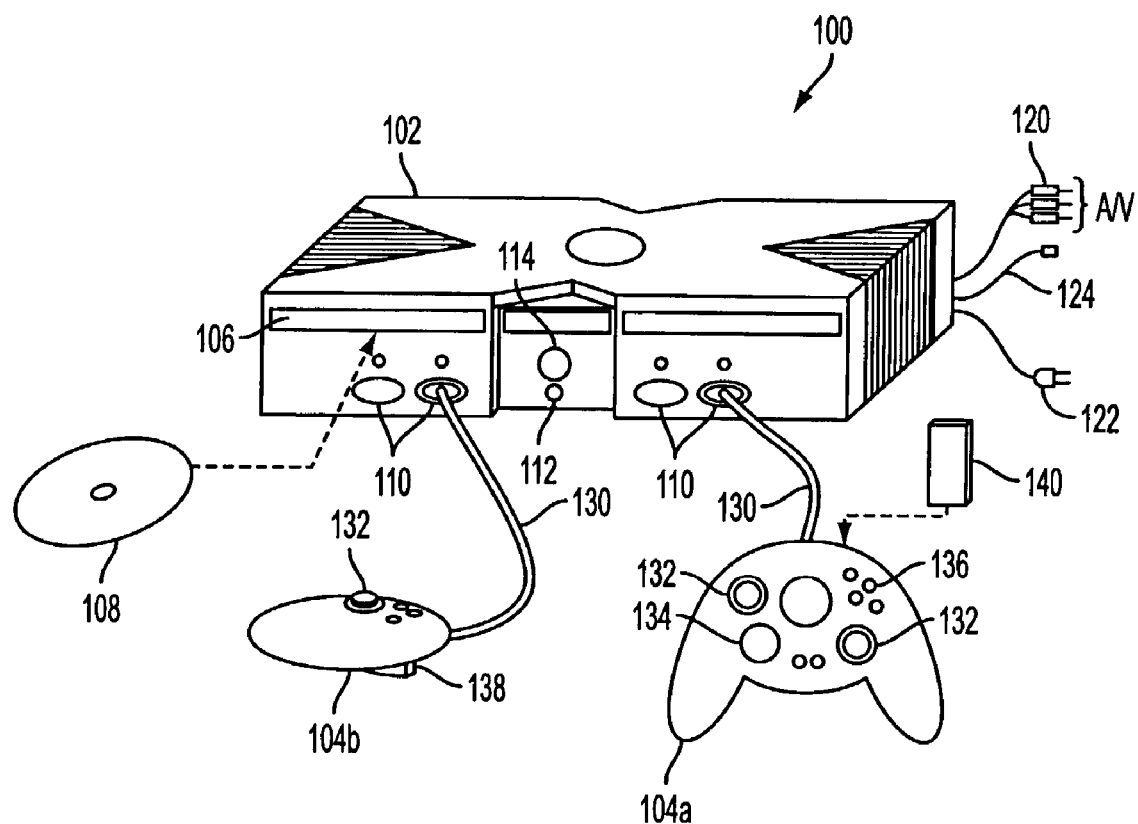
FIG. 1 is a perspective view of an exemplary gaming system.

Various aspects of the present invention may be implemented in connection with gaming systems, as discussed above. Accordingly, an enhanced understanding of the invention may be gained by briefly discussing the components and operation of an exemplary gaming system 100, as depicted in FIG. 1, on which various embodiments of the invention may be employed. The gaming system 100 includes a game console 102 and up to four controllers, as represented by controllers 104a and 104b. The game console 102 is equipped with an internal hard disk drive and a portable media drive 106 that supports various forms of portable storage media 108, as represented by an optical storage disc. Examples of suitable portable storage media 108 include DVD, CD-ROM, game discs, and so forth.

The game console 102 has four slots 110 on its front face to support up to four controllers 104a and 104b, although the number and arrangement of slots may be modified. A power button 112 and an eject button 114 are also positioned on the front face of the game console 102. The power button 112 switches power to the game console, and the eject button 114 alternately opens and closes a tray of the portable media drive 106 to allow insertion and extraction of the portable storage media 108.

The game console 102 connects to a television or other display via A/V interfacing cables 120. A power cable 122 provides power to the game console. The game console 102 may further be configured with broadband capabilities, as represented by the cable or modem connector 124 to facilitate access to a network, such as the Internet.

Each controller 104a and 104b is coupled to the game console 102 via a wired or wireless interface. In the illustrated implementation, the controllers are USB (Universal Serial Bus) compatible and are connected to the console 102 via serial cables 130. The controllers 104a and 104b may be equipped with any of a wide variety of user interaction mechanisms. As illustrated in FIG. 1, controller 104a is equipped with two thumbsticks 132, a D-pad 134, and a variety of buttons 136. Controller 104b includes one thumbstick 132, button 136, and a trigger 138 These mechanisms are merely representative, and other known interaction mechanisms may be substituted for or added to those shown in FIG. 1.

A memory unit 140 may be inserted into either of the controllers 104a or 104b or into the game console 102 to provide additional and portable storage. A portable memory unit 104 enables users to store game parameters and port them for play on other consoles that are similar to console 102. For example, a user may save a game to memory unit 140 using the game console 102 then use that saved game data with a game executed on a different game console. In the described implementation, each controller is configured to accommodate two memory units 140, although more or less than two units may be employed in other implementations. A particular game console 102 may be configured to accommodate any number of memory units 140.

The gaming system 100 is capable of playing, for example, games, music, and videos. With the different storage offerings, titles can be played from the hard disk drive or the portable storage media 108 in portable media drive 106, from an online source, or from a memory unit 140. Examples of media that the gaming system 100 is capable of operating include: (1) Game titles played from CD and DVD discs, from the hard disk drive, or from an online source; (2) Digital music played from a CD in the portable media drive 106, from a file on the hard disk drive (e.g., WINDOWS MEDIA Audio (WMA) format), or from online streaming sources; and (3) Digital audio/video played from a DVD disc in the portable media drive 106, from a file on the hard disk drive (e.g., Active Streaming Format), or from online streaming sources.

Figure 2:
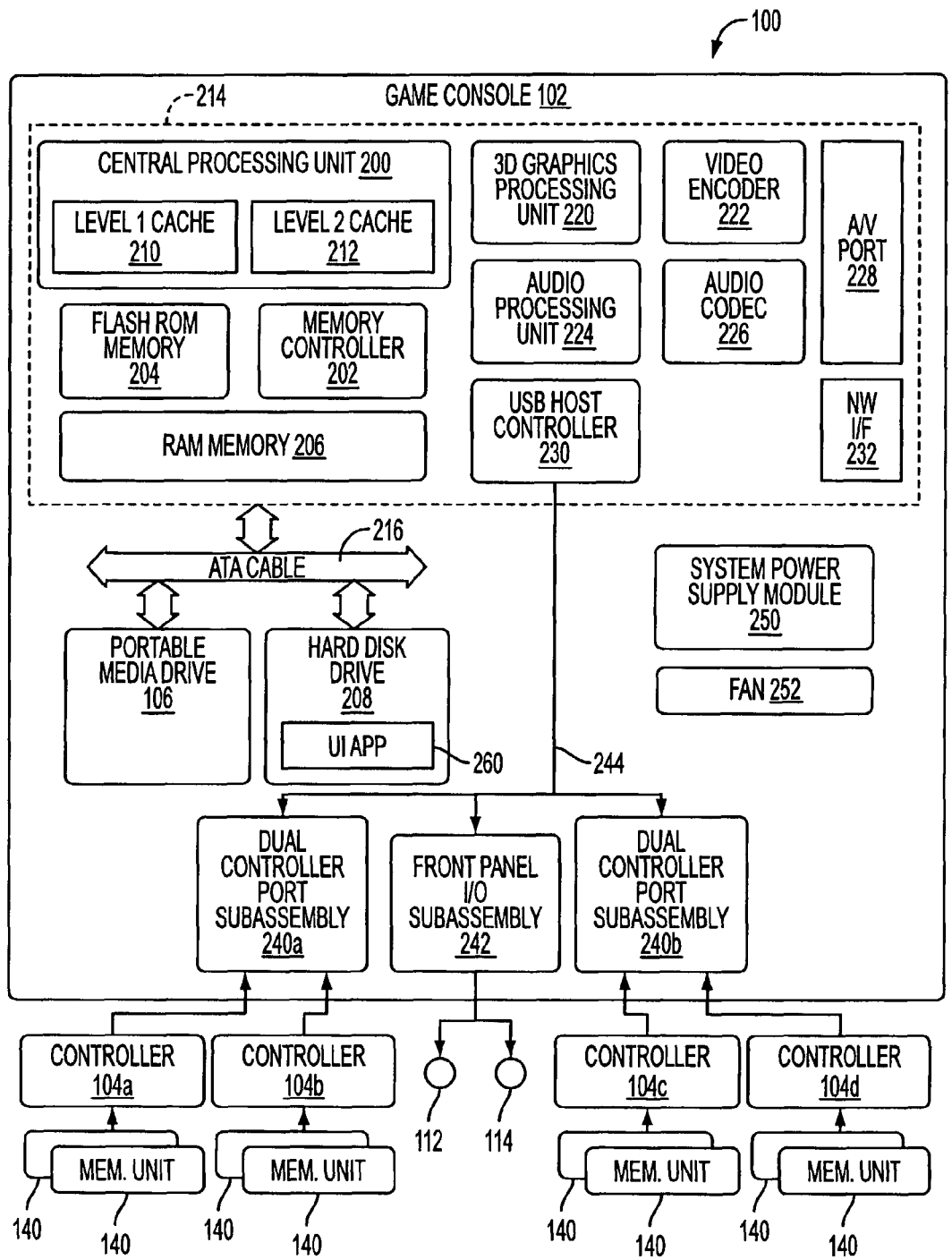
FIG. 2 is a block diagram of the gaming system.

FIG. 2 depicts functional components of the gaming system 100 in further detail. The game console 102 has a CPU (central processing unit) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and, therefore, reduce the number of memory access cycles to improve processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) that are independently controlled by the memory controller 202 via separate buses (not depicted). The hard disk drive 208 and portable media drive 106 are connected to the memory controller 202 via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not depicted). An audio processing unit 224 and an audio codec (coder/decoder) 226 form a corresponding audio processing pipeline with high fidelity and stereo processing. Audio data is carried between the audio processing unit 224 and the audio codec 226 via a communication link (not depicted). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the controllers 104a and 104b and additional controllers 104c and 104d. The network interface 232 provides access to a network (e.g., the Internet, home network, etc.) and may be any of a wide variety of various wired or wireless interface components including an Ethernet card, a modem, a Bluetooth module, a cable modem, and the like.

The game console 102 has two dual controller support subassemblies 240a and 240b, with each subassembly supporting two of the controllers 104a-104d. A front panel I/O subassembly 242 supports the functionality of the power button 112 and the eject button 114, as well as any LEDs (light emitting diodes) or other indicators exposed on the outer surface of the game console. The subassemblies 240a, 240b, and 242 are coupled to the module 214 via one or more cable assemblies 244.

Eight memory units 140 are illustrated as being connectable to the four controllers 104a-104d (i.e., two memory units for each controller). Each memory unit 140 offers additional storage on which games, game parameters, and other data may be stored. When inserted into a controller, the memory unit 140 can be accessed by the memory controller 202. Additionally, one or more memory units 140 may be inserted into game console 102 and accessed by the memory controller 202. A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106. To implement the uniform media portal model, a console user interface (UI) application 260 is stored on the hard disk drive 208. When the game console is powered on, various portions of the console application 260 are loaded into RAM 206 and/or caches 210 and 212 and executed on the CPU 200. The console application 260 presents a graphical user interface that provides a consistent user experience when navigating to different media types available on the game console. Thus, the hard disk drive 208 (and the data stored thereon) is an important part of the initialization process. If the hard disk drive 208 is not functioning properly, the gaming system 100 may not boot successfully.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community.

Figure 3:
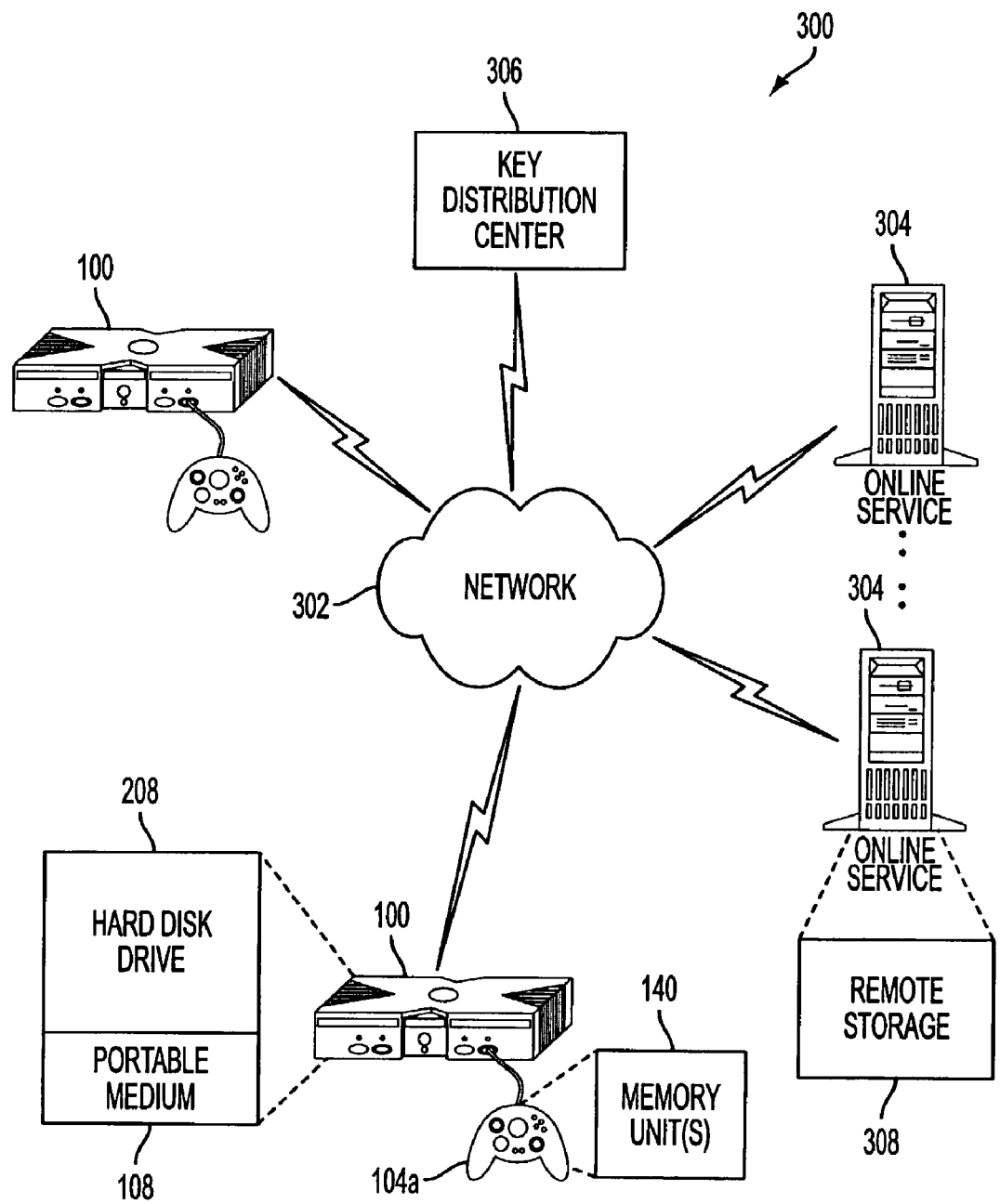
FIG. 3 is a schematic view of a network that incorporates the gaming system.

FIG. 3 depicts an exemplary network gaming environment 300 that interconnects multiple gaming systems 100 via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304 may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100, online storage. In addition to the portable storage media 108, the hard disk drive 208, and the memory units 140, the gaming system 100 may also access data files available at remote storage locations via the network 302, as exemplified by remote storage 308 at online service 304.

Input Device

Figure 4:
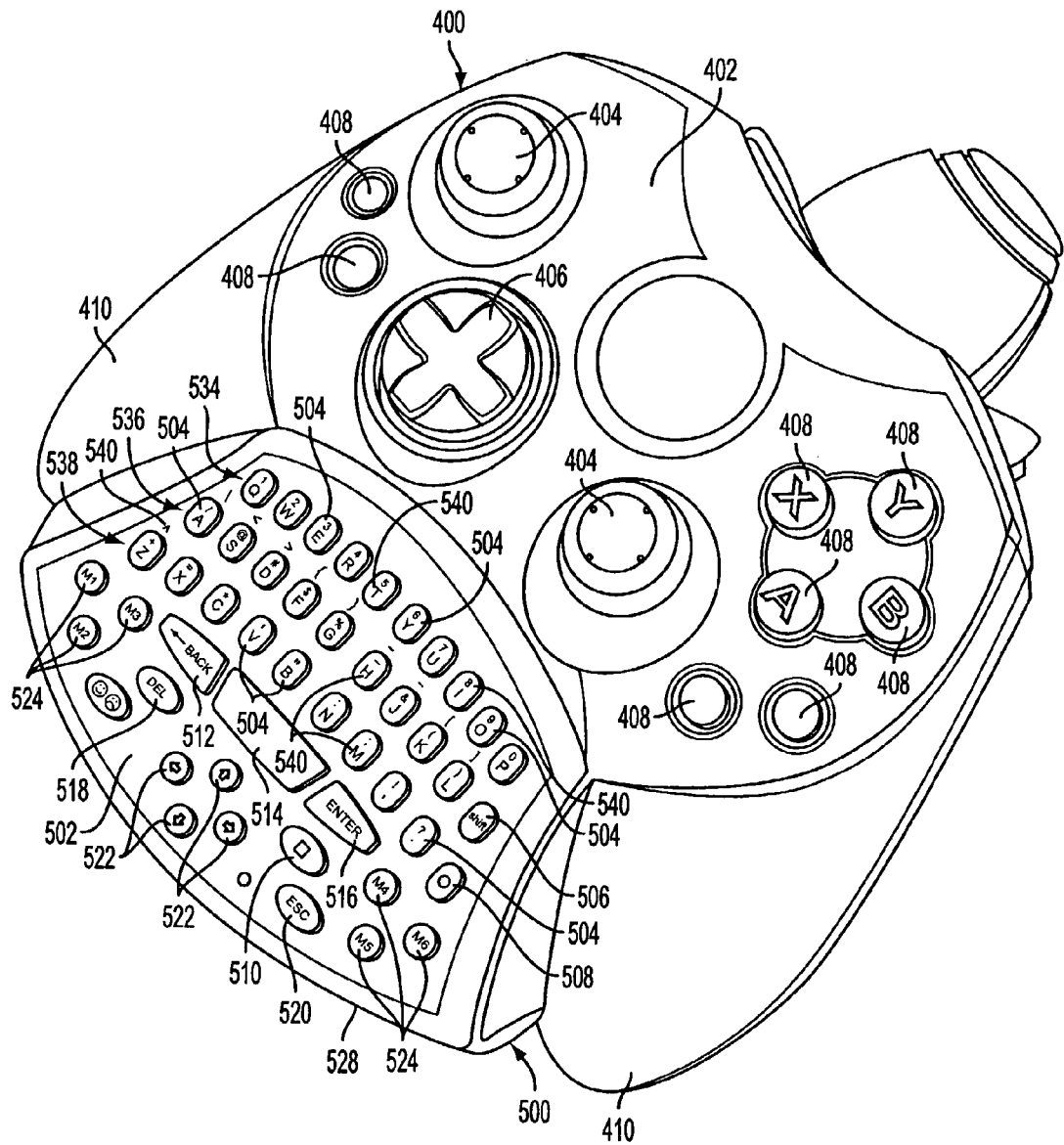
FIG. 4 is a perspective view of an input device having a game controller portion and a character input portion with a first character configuration.
Figure 5:
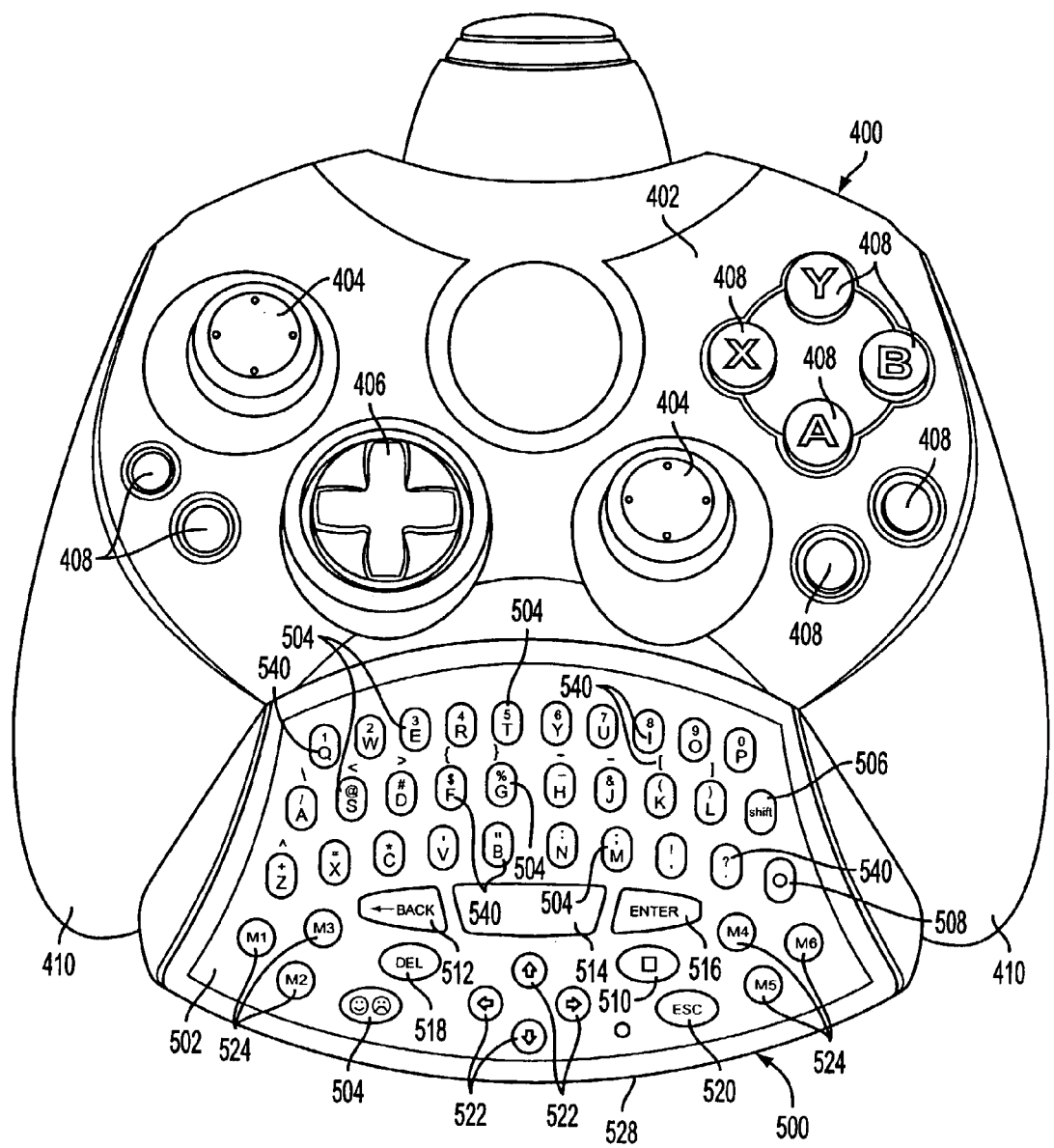
FIG. 5 is a top plan view of the input device.

An input device that is a combination of a game controller portion 400 and a character input portion 500 is disclosed in FIGS. 4 and 5. Within the scope of the present invention, the term "input device" is defined as any implement that transmits a signal to a computing device, such as the game console 102, in response to user interaction with the input device. The game controller portion 400 includes a plurality of interaction mechanisms that are operated by a user to direct game play. Similarly, the character input portion 500 also includes a plurality of interaction mechanisms that are operated by the user to input various characters. Accordingly, the game controller portion 400 and the character input portion 500 each transmit signals to the game console 102 based upon user interaction and may be considered an input device individually or in combination.

The various features and operation of the game controller portion 400 are well-known in the art and will not be discussed at length here. In general, however, the game controller portion 400 has the configuration and function of the controllers 104a-104d discussed above. Accordingly, the game controller portion 400 may be coupled to the game console 102 via a wired or wireless interface. The game controller portion 400 may also be USB compatible, thereby connecting to the game console 102 via a serial cable. A housing 402 forms a majority of an exterior surface of the game controller portion 400 and is shaped to interface with hands of a user. A variety of user interaction mechanisms protrude from housing 402 and include two thumbsticks 404, a D-pad 406, and a variety of buttons 408. A pair of triggers may also be positioned under a pair of grips 410, which are formed from the housing 402 and provide an area for grasping the game controller portion 400 during use. The game controller portion 400 also includes a pair of slots (not depicted) that may each receive one of memory units 140 to provide additional and portable storage. The game controller portion 400 may be configured, however, to accommodate any number of memory units 140. The structure of the game controller portion 400 and the various interaction mechanisms described herein are merely representative, and other structures or interaction mechanisms may be substituted for or added to those shown in the FIGS. 4 and 5.

Figure 6:
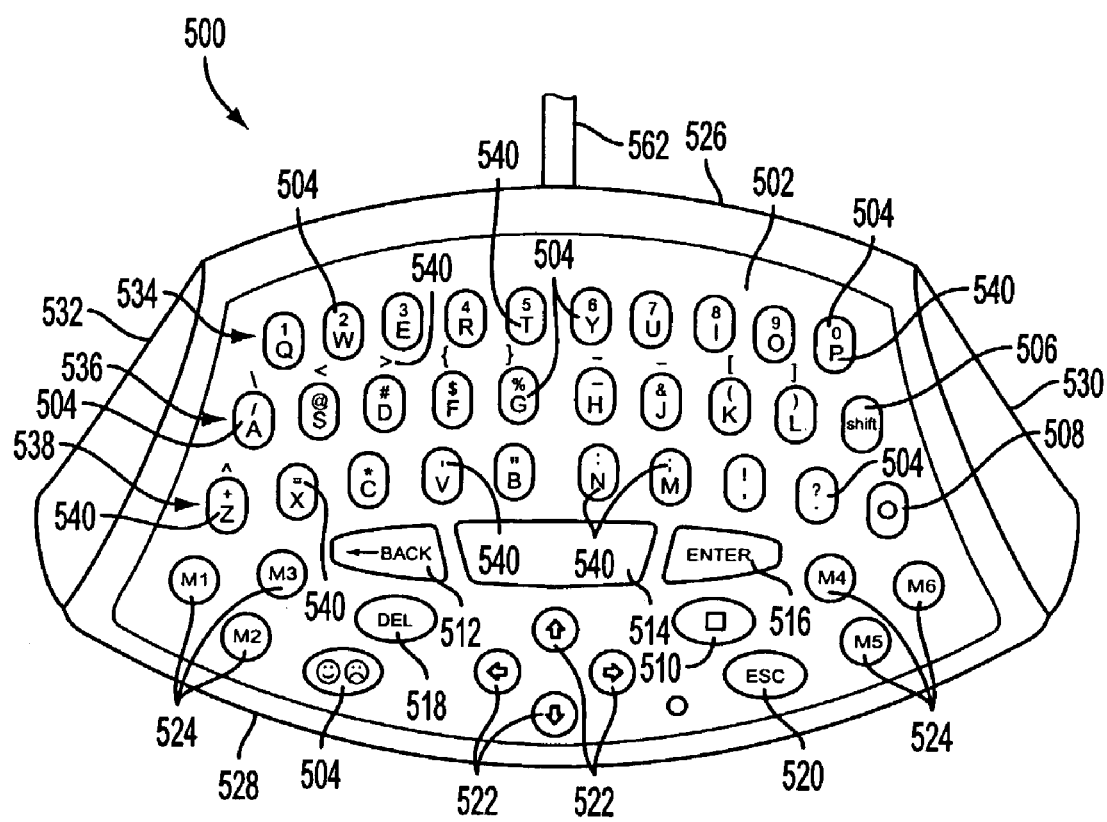
FIG. 6 is a top plan view of the character input portion.

The character input portion 500, depicted individually in FIG. 6, is detachably-secured to the game controller portion 400 and may be utilized to enter various characters during game play. The characters may be utilized to provide identifiers for various players, or to facilitate communication among the various players, for example. The term character, as utilized herein, is intended to encompass a symbol or other figure that may be entered by the individual with the character input portion 500. Examples of characters include alphabetic characters, whether from the Roman, Cyrillic, Arabic, Hebrew, or Greek alphabets, for example. Furthermore, a character may be a numeral, a punctuation mark, or one of the various symbols that are commonly utilized in written or printed text, such as $, #, %, &, or @, for example. In addition, a character may be one of the various symbols utilized in Asian languages, such as the Chinese, Japanese, and Korean languages.

The character input portion 500 interfaces mechanically and electrically with the game controller portion 400. With regard to the mechanical interface, the character input portion 500 includes a housing 502 that is shaped to abut the housing 402 between the grips 410. An arm (not depicted) or other connection device that detachably-connects to both the game controller portion 400 and the character input portion 500 may extend under both components to secure the components together. Such a mechanical interface permits the character input portion 500 to be detached from the game controller portion 400 when not in use. Regarding the electrical interface, the character input portion 500 may include a connector that electrically-joins with one of the slots that receive the memory units 140 in the game controller portion 400. Within the scope of the present invention, the character input portion 500 may interface mechanically and electrically with the game controller portion 400 through a plurality of other mechanisms. For example, magnetic connectors or other mechanical connection devices may be utilized to detachably-secure the character input portion 500 to the game controller portion 400. Furthermore, a wireless connection may be utilized to form the electrical interface between the character input portion 500 to the game controller portion 400. As an alternate structure, the character input portion 500 may also electrically interface directly with the game console 102.

When the user holds the input device, which includes the game controller portion 400 and the character input portion 500, in both hands, the palms of the hands are in full contact with the grips 410 and the thumbs or other fingers may extend over the character input portion 500. In this position, the distance by which the palms are separated may be approximately 7.5 inches or less, or may be between 5.63 and 6.38 inches, for example. The character input portion 500 extends between the grips 410. Accordingly, the character input portion 500 has a width dimension that is less than the distance by which the palms are separated, and the width dimension is substantially less than the width of a conventional keyboard, for example.

A plurality of keys associated with the character input portion 500 are accessible by the user while operating the character input portion 500. The keys may have a depressible structure, for example, that protrudes through an upper surface of the housing 502. Alternately, the keys may be touch-sensitive. The various keys include a plurality of character input keys 504, a first mode-altering key 506, a second mode-altering key 508, a third mode-altering key 510, a backspace key 512, a space key 514, an enter key 516, a delete key 518, an escape key 520, four arrow keys 522, and six modifiable keys 524.

For reference purposes, the character input portion 500 has a back edge 526 distal from the user during normal use, and a front edge 528 adjacent the user during normal use. Accordingly, an object is said herein to be "behind" another object when it is between that object and the back edge 526. An object is said herein to be "in front of" another object when it is between that object and the front edge 528. Further, the character input portion 500 also has a right edge 530 and a left edge 532. The direction "lateral" defines the general directions from the right edge 530 to the left edge 532, and from the left edge 532 to the right edge 530.

The character input keys 504 are generally arranged in three rows 534, 536, and 538 that extend in the lateral direction. The first row 534 includes ten of the character input keys 504 and is positioned in front of the back edge 526 and behind the second row 536. The second row 536 includes nine of the character input keys 504 and is positioned in front of the first row 534 and behind the third row 538. Similarly, the third row 538 includes nine of the character input keys 504 and is positioned in front of the second row 536 and behind the backspace key 512, the space key 514, and the enter key 516. In addition, one character input key 504 is positioned adjacent and behind the front edge 528. Based upon the above discussion and the figures, the character input portion 500 includes twenty-nine character input keys 504.

Many of the character input keys 504 are associated with alphabetic characters, numeric characters, punctuation mark characters, or various other characters and have a corresponding character identifier 540 located thereon. Many of the character input keys 504 have a character identifier 540 with the form of an alphabetic character, in addition to other types of characters. The two character input keys 504 positioned on a right side of the third row 538, however, are not associated with alphabetic characters and include character identifiers 540 related to various punctuation marks. Similarly, the character input key 504 positioned adjacent and behind the front edge 528 includes character identifiers 540 corresponding with a smiling face and a frowning face.

As depicted in FIGS. 4-6, the various character identifiers 540 are located on the character input keys 504 and adjacent to the character input keys 504. The character identifiers 540 provide identification regarding the various characters that may be input with each character input key 504. For example, the character input key 504 positioned in the first row 534 and adjacent the left edge 532 has two character identifiers 540 located thereon having the form of the alphabetic character "Q" and the numeric character "1". A user will intuitively understand, therefore, that this specific character input key 504 may be utilized to enter the lowercase alphabetic character "q", the uppercase alphabetic character "Q", and the numeric character "1". In addition, the character input key 504 positioned in the second row 536 and adjacent the left edge 532 has two character identifiers 540 located thereon having the form of the alphabetic character "A" and the character "/", and the character "\" is positioned adjacently. The user will intuitively understand, therefore, that this specific character input key 504 may be utilized to enter the lowercase alphabetic character "a", the uppercase alphabetic character "A", the character "/", and the character "\". As a further example, the character input key 504 positioned in the third row 538 and adjacent the second mode-altering key 508 has two character identifiers 540 located thereon having the form of the punctuation marks "." and "?", which may be input by the user by activating this character input key 504.

In order to enter the various characters identified by the character identifiers 540, the mode-altering keys 506, 508, and 510 may be employed. In general, the mode-altering keys 506, 508, and 510 may be color-coded to correspond with the various character identifiers 540. For example, the "shift" indicia on the first mode-altering key 506 may have a black color that corresponds with the various alphabetic character identifiers 540 located on many of the character input keys 504. The circular indicia on the second mode-altering key 508 may have a blue color that corresponds with the various character identifiers 540 on many of the character input keys 504 and rearward of other alphabetic character identifiers 540. Similarly, the third mode-altering key 510 may have a green color that corresponds with the various character identifiers 540 located on the housing 502 and adjacent to some of the character input keys 504. The black, blue, and green coloring of the mode-altering keys 506, 508, and 510, and the black, blue, and green coloring of the character identifiers 540, assist in alerting the user as to the relationships between the mode-altering keys 506, 508, and 510 and the specific character that will be inputted upon activating one of the character input keys 504.

The following discussion will reference specific character input keys 504 based upon the character identifier 540 located thereon. For example, the character input key 504 positioned in the first row 534 and adjacent the left edge 532, which has the character identifier 540 with the form of the alphabetic character "Q" located thereon, will be referred to in the following discussion as the Q key 504. Similarly, the character input key 504 positioned in the second row 53 and adjacent the left edge 532, which has the character identifier 540 with the form of the alphabetic character "A" located thereon, will be referred to in the following discussion as the A key 504.

The mode-altering keys 506, 508, and 510 may be utilized in combination with the character input keys 504 such that each of the character input keys 504 have the capacity to input multiple characters. The first mode-altering key 506 is positioned in the second row 536 and adjacent to the right edge 530, and the indicia "shift" is located on a top surface of the first mode-altering key 506. The first mode-altering key may be utilized to switch between entering lowercase characters and uppercase characters. In the absence of activating the first mode-altering key 506, many of the character input keys 504 will input a lowercase alphabetic character. For example, the Q key 504 will input the lowercase alphabetic character "q" when the first mode-altering key 506 is not activated. When the first mode-altering key 506 is activated and then the Q key 504 is activated, however, the uppercase alphabetic character "Q" will be input. Accordingly, the first mode-altering key 506 may be utilized to input uppercase alphabetic characters.

Once activating the first mode-altering key 506 and then activating one of the character input keys 504 will input an uppercase alphabetic character. Subsequent activations of the character input keys 504, without an associated activation of the first mode-altering key 506, will input lowercase alphabetic characters. If the user intends to input a series of uppercase alphabetic characters, the user may twice activate the first mode-altering key 506. Subsequent activations of the character input keys 504 will input uppercase alphabetic characters until the user again activates the first mode-altering key 506. Accordingly, the user may lock the character input portion 500 into an uppercase mode by twice activating the first mode-altering key 506. Also, the user may unlock the character input portion 500 from the uppercase mode by again activating the first mode-altering key 506.

The second mode-altering key 508 may be utilized in combination with the character input keys 504 to input characters that correspond with the various character identifiers 540 on many of the character input keys 504 and rearward of other alphabetic character identifiers 540. For example, activating the second mode-altering key 508 and then activating the Q key 504 will input the numeric character "1". Similarly, the third mode-altering key 510 may be utilized to input the various characters associated with the character identifiers 540 positioned on the housing 502. For example, activating the third mode-altering key 510 and then activating the A key 504 will input the character "\".

The various keys 512-522 may be utilized in a manner that is generally consistent with a conventional keyboard. Accordingly, the backspace key 512 may be utilized to erase a character that is behind a cursor, the space key 514 may be utilized to form a space between two characters, the enter key 516 may be utilized to affirmatively enter various characters, and the delete key 518 may be utilized to delete a character that is in front of the cursor, for example. The escape key 520 may be utilized for exiting various graphical user interfaces, and the various arrow keys 522 may be utilized to move the cursor in a direction that is consistent with indicia having the shape of an arrow and located thereon. Accordingly, the keys 512-522 may have a use that is similar to corresponding keys on a keyboard or other input device. Within the scope of the present invention, however, alternate uses may be associated with the various keys 512-522.

The character input portion 500 also includes six modifiable keys 524 that each bears one of the following indicia: M1, M2, M3, M4, M5, and M6. The functions associated with each of the modifiable keys 524 may be modified by the user. For example, the user may set each of the modifiable keys 524 such that a series of characters are input when activated. The modifiable keys 524 may also have functions that vary depending upon the specific software application that is being utilized in connection with the character input portion 500.

Based upon the above discussion, the character input portion 500 has a structure that mechanically and electrically interfaces with the game controller portion 400 and may, therefore, be detachably-secured to the game controller portion 400. The character input portion 500 includes a plurality of character input keys 504 that are associated with a plurality of characters. By activating the character input keys 504, signals indicative of various characters may be transmitted to the game console 102, thereby inputting characters. By also activating one of the mode-altering keys 506, 508, and 510, signals indicative of various other characters may be transmitted to the game console 102.

Figure 7:
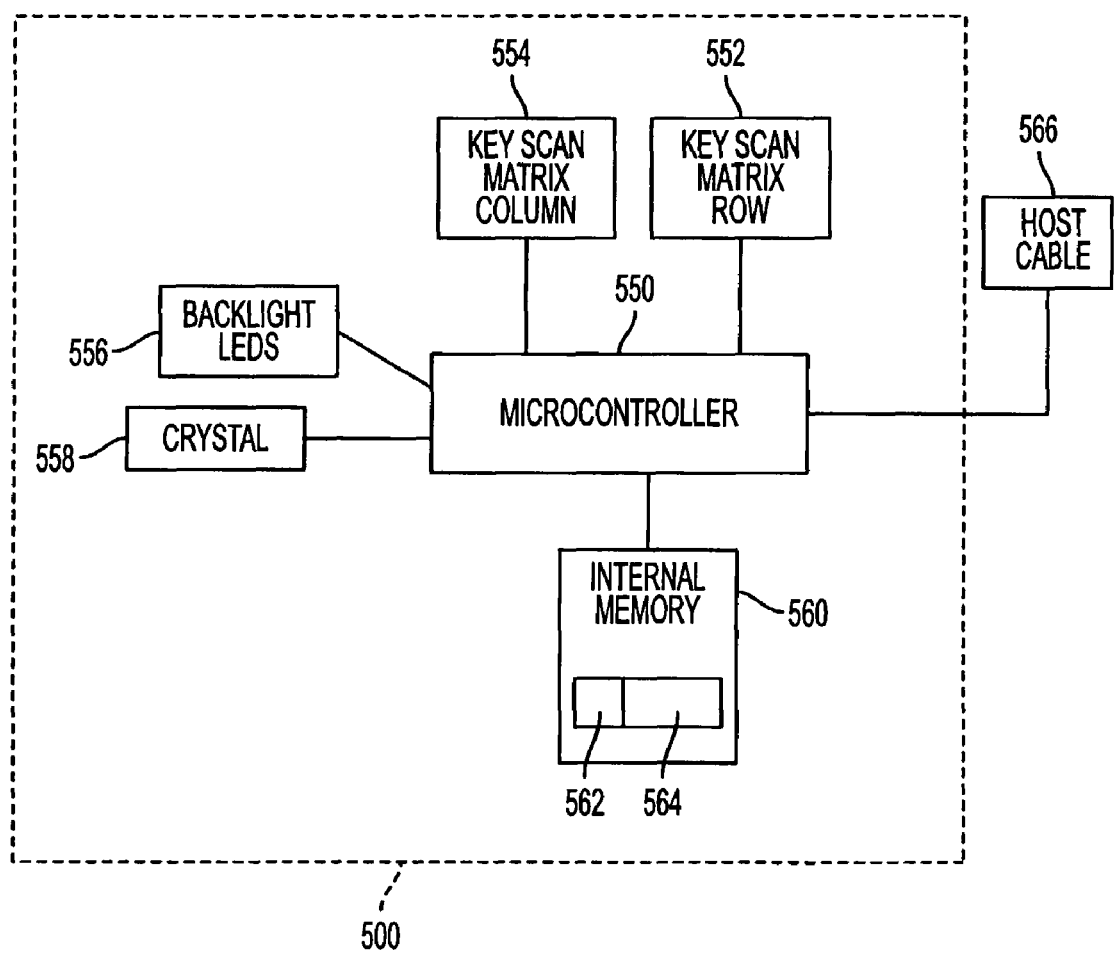
FIG. 7 is a block diagram illustrating the electrical configuration of the character input portion.

A block diagram depicting the electrical configuration of the character input portion 500 is represented in FIG. 7. From an electrical perspective, the character input portion 500 includes a microcontroller 550, a pair of key scan matrices 552 and 554, backlight LEDs (light emitting diodes) 556, a crystal 558, internal memory 560, and a host cable 566. The microcontroller 550 may include a central processing unit, read only memory, random access memory, and various ports for communicating with the internal memory 560 and the key scan matrices 552 and 554. The key scan matrices 552 and 554 operate to determine which specific key is activated on the character input portion 500. That is, the key scan matrices 552 and 554 provide column and row information that may be utilized by the microprocessor to distinguish between activations of the various character input keys 504, the space key 514, and the arrow keys 522, for example. The backlight LEDs 556 operate to provide lighting for the various keys, and the crystal 558 oscillates to provide a timing function. The internal memory 560 stores data that is relevant to the operation of the character input portion 500. As will be described below, the internal memory 560 includes a configuration code area 562 and a key mapping configuration area 564. One suitable type of internal memory 560 is an electrically erasable programmable read only memory (EEPROM). Finally, the character input portion 500 includes a host cable 566 that may electrically-join with one of the slots that receive the memory units 140 in the game controller portion 400.

Configurability of the Character Input Portion

Figure 8:
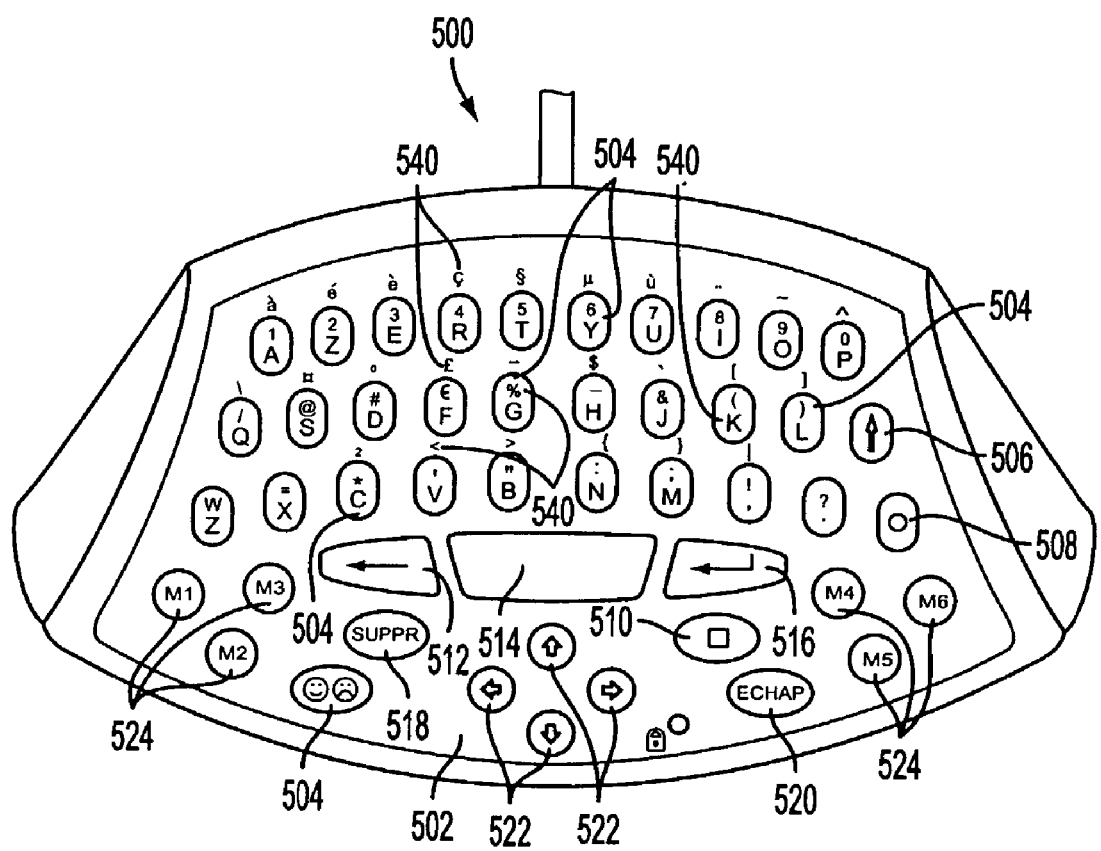
FIG. 8 is a top plan view of the character input portion with a second character configuration.
Figure 9:
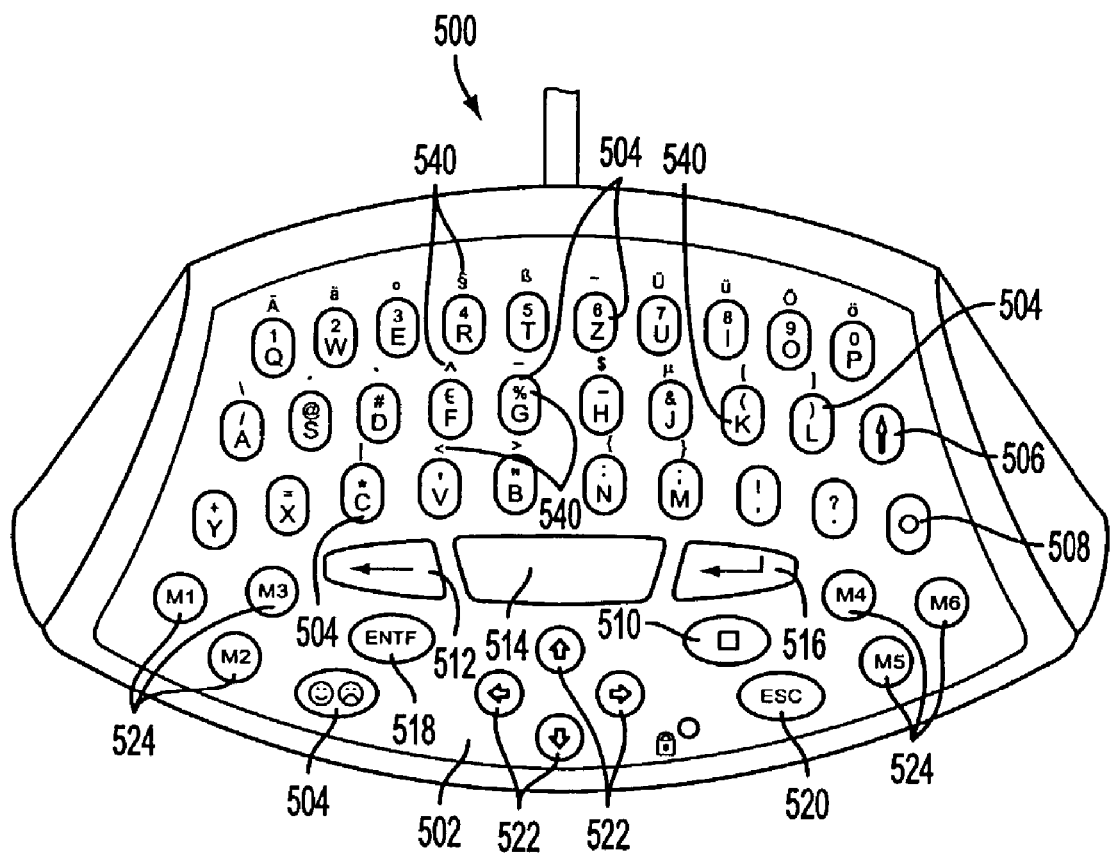
FIG. 9 is a top plan view of the character input portion with a third character configuration.
Figure 10:
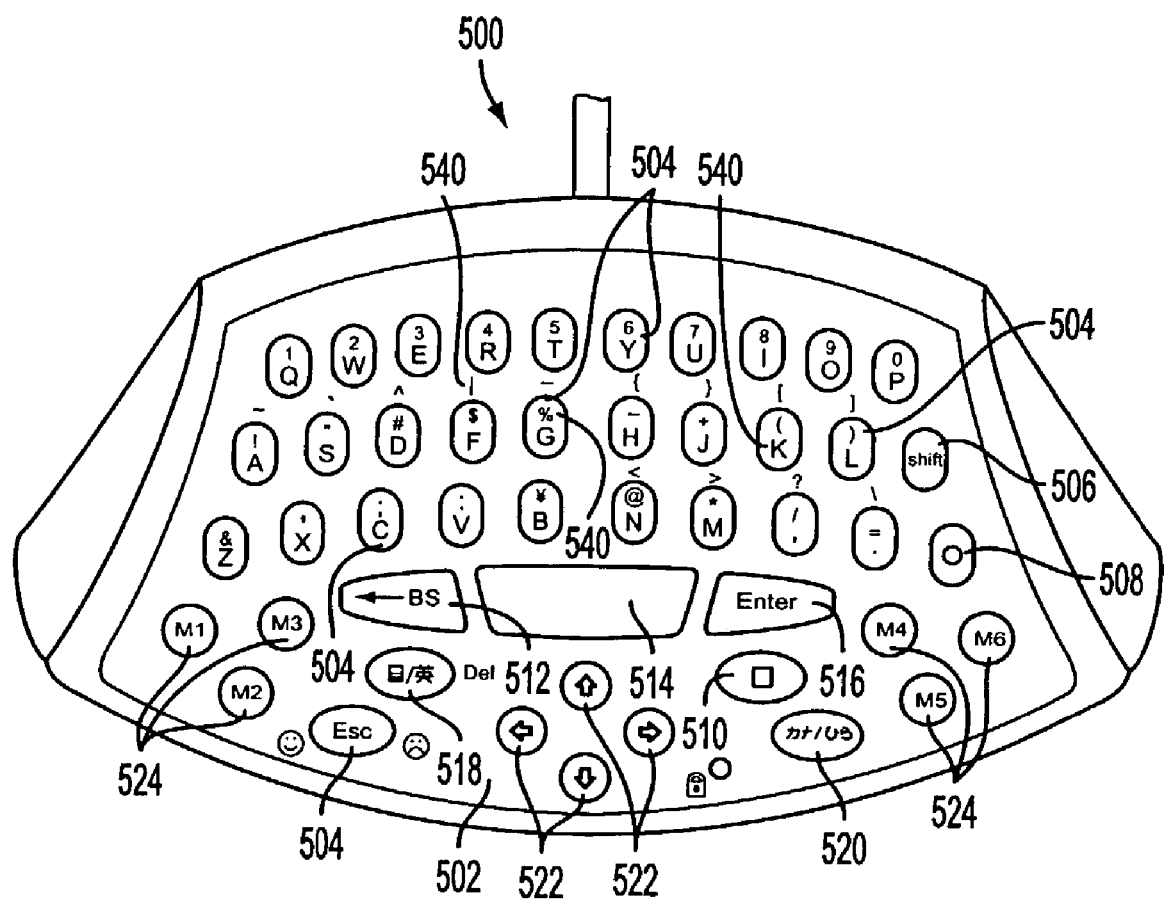
FIG. 10 is a top plan view of the character input portion with a fourth character configuration.

The character input portion 500 depicted in FIG. 6 and discussed above has a character configuration generally suited for a user that is familiar with the language and customs of the United States. The character input portion 500 may be configured during manufacturing or reconfigured by the user to have a different character configuration generally suited for users that are familiar with the languages and customs of different countries or regions. Accordingly, the character input portion 500 may also exhibit the character configurations depicted in FIGS. 8-10, which are specifically suited for users that are familiar with the respective languages and customs of France, Germany, and Japan.

The differences between the various character configurations of the character input portion 500 may be generally summarized as follows: First, each character input portion 500 includes a different configuration code that is stored within the configuration code area 562 and identifies the specific character configuration of the character input portion 500. Second, each character input portion 500 includes a different key mapping configuration that is stored within the key mapping configuration area 564 and determines which specific character is input when a specific character input key 504 is activated. Third, each character input portion 500 includes different labels (i.e., character identifiers 540) that are associated with the character input keys 504, for example, and identify the characters that will be input by activating the character input keys 504. Accordingly, the character input portions 500 that are depicted in FIGS. 6 and 8-10 are substantially identical, except for the different characters configurations.

When one of the character input portions 500 is connected to the game console 102 and power is supplied, the character input portion 500 loads data from the internal memory 560, including the key mapping configuration data stored within key mapping configuration area 566. The character input portion 500 then utilizes the key mapping configuration data to determine the specific character that should be input when a specific character input key 504 is activated. Because each of the character configurations for the character input portions 500 that are depicted in FIGS. 6 and 8-10 are different, the key mapping configurations are also different.

The different key mapping configurations for the character input portions 500 that are depicted in FIGS. 6 and 8-10 may be identified by the positions and content of the character identifiers 540. In general, the key mapping configurations differ in two respects: First, the specific character input key 504 that a specific character is associated with may vary. Second, the characters that are available for input may also vary. Each of these differences in the key mapping configurations will be discussed below.

The associations between the character input keys 504 and the characters that are entered by a specific character input key 504 may vary, as discussed above. In the character configurations of FIGS. 6, 9, and 10, the relative locations of the alphabetic character identifiers 540 are similar to the various character identifiers on a conventional QWERTY-type keyboard. In the character configuration of FIG. 8, however, the relative locations of the alphabetic character identifiers 540 are similar to the various character identifiers on a conventional AZERTY-type keyboard. For example, therefore, the character "a" is input when the left-most character input key 504 in the first row 534 is activated for the character input portion 500 in FIG. 8, whereas the character "q" is input for the same character input key 504 in the other character input portions 500. Accordingly, the specific character input key 504 that a specific character is associated with may vary. Further differences in the key mapping configurations between the various character input portions 500 may be determined with reference to the positions and specific characters that are represented by the character identifiers 540 in FIGS. 6 and 8-10.

The characters that are available for input with each character input portion 500 may also vary. For example, the F key 504 in FIG. 6 may be activated to enter the character "$" and denote monetary amounts in United States dollars. The character input portion 500 depicted in FIGS. 8 and 9, however, include the character "€" to denote monetary amounts in Euros. Furthermore, the character configuration of the character input portion 500 in FIG. 10 includes the character "¥" to denote monetary amounts in Yen. As a further example, FIG. 9 includes various alphabetic characters in combination with an umlaut, such as "ä", "ö", and "ü". Given that these characters are not commonly utilized in the cultures or the languages of the United States and France, alphabetic characters in combination with an umlaut are not present in the character configurations of the character input portions 500 depicted in FIGS. 6 and 8. Accordingly, the specific characters that may be input by each character input portion 500 may vary depending upon the geographic location, language, culture, or various preferences of the user.

An advantage of the character input portion 500 relates to the concept of configurability both during the manufacturing process and by the user. As an example, a first character input portion 500 (e.g., the character input portion 500 depicted in FIG. 6) and a second character input portion 500 (e.g., the character input portion 500 depicted in FIG. 8) may be manufactured in a substantially identical manner regardless of the character configurations that are imparted to the first and second character input portions 500. During the final stages of the manufacturing process, however, character identifiers 540 that are specifically-designed for a first location, culture, and/or language may be placed on the various keys and on the housing 502 of the first character input portion 500, and a corresponding configuration code and key mapping configuration may be programmed into the internal memory 560. Similarly, other character identifiers 540 that are specifically-designed for a second location, culture, and/or language may be placed on the various keys and on the housing 502 of the second character input portion 500 during the final stages of the manufacturing process, and a corresponding configuration code and key mapping configuration may be programmed into the internal memory 560. Accordingly, a plurality of substantially similar character input portions 500 may be manufactured in an identical manner, with the various character configurations being added during the final stages of the manufacturing process.

Manufacturing a plurality of substantially similar character input portions 500 and then adding the various characteristics that are unique to a particular location, culture, and/or language introduces efficiency to the manufacturing process. In general, all character input portions 500 may be substantially manufactured on a single assembly line without the need to introduce variations that are unique to a particular intended use location of each character input portion 500. Accordingly, the various character input portions 500 may be manufactured such that the internal memory 560 is positioned within the housing 502 and the housing is sealed. During the final stages of the manufacturing process, however, particular character input portions 500 may be diverted to specific manufacturing areas that add the character identifiers 540 and input the corresponding configuration code and key mapping configuration. Accordingly, a majority of the manufacturing process is efficiently organized along a single assembly line, and the character configurations may be added in the final stages of the manufacturing process.

A further manufacturing benefit of the configurability relates to future demand in specific locations. For example, various character input portions 500 may be manufactured to have a neutral character configuration (i.e., without character identifiers 540, a configuration code, or a key mapping configuration) and then the character input portions 500 may be stored. As quantities of character input portions 500 are required in specific locations, the character input portions 500 with the neutral character configuration may be retrieved and provided with the appropriate character identifiers 540, configuration codes, and key mapping configurations. Accordingly, a plurality of character input portions 500 may be substantially manufactured and then provided with character configurations as demand arises in a particular location, within a particular culture, or within areas that are commonly associated with a particular language.

Character input portion 500 may also be reconfigured by the user or another individual (e.g., by an individual in the business of refurbishing electronic equipment). As an example, a user that is proficient with the language and culture of a first location may purchase the character input portion 500 in a second location, and the character input portion 500 may have the character identifiers 540 and the configuration code that are associated with the second location. In order to reconfigure the character input portion 500 for the language and the characters that are commonly utilized in the first location, the user performs two general steps. First, the user alters the configuration code and the key mapping configuration stored in the internal memory 560 to the configuration code and key mapping configuration of the first location, by reprogramming the EEPROM, for example. Second, the user replaces the character identifiers 540 associated with the second location with the character identifiers 540 associated with the first location. Replacing the character identifiers 540 may involve removing the pre-existing character identifiers 540 and adding labels to the character input portion 500. Replacing the character identifiers 540 may also involve placing labels over the pre-existing character identifiers 540.

Various other situations may arise wherein a user may wish to reconfigure one of the character input portions 500. For example, the user may purchase a character input portion 500 that was utilized by a prior user and is configured for one location, language, and/or culture. The user may, therefore, replace the character identifiers 540 and reprogram the configuration code and the key mapping configuration in the internal memory 560, thereby reconfiguring the character input portion 500 for the specific preferences of the user.

Procedures for Configuring the Character Input Portion

Figure 11:
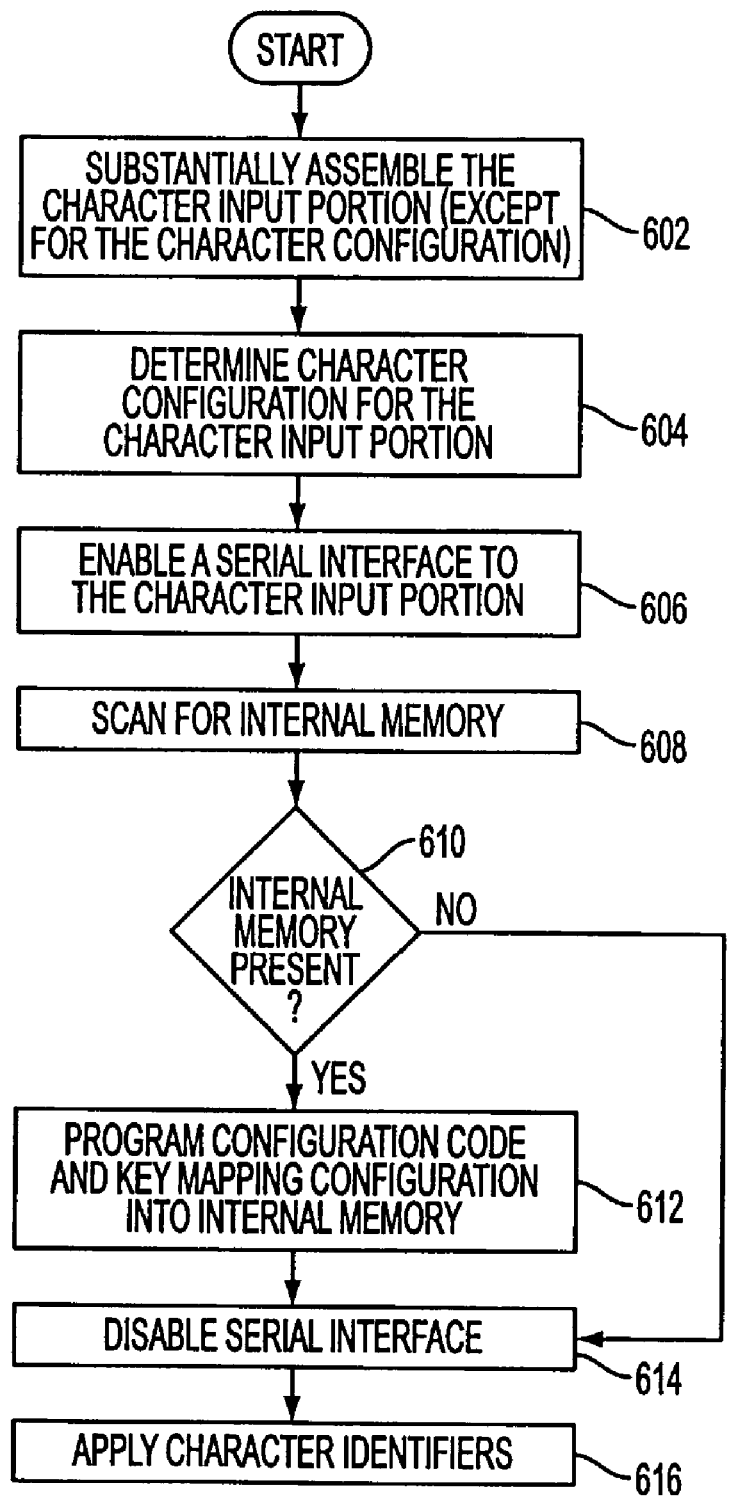
FIG. 11 is a first flow diagram that illustrates a procedure for configuring the character input portion to have a character configuration.

The character input portion 500 may be configured during the manufacturing process or by the user, as discussed above, and the various procedures for configuring the character input portion 500 will now be discussed. Referring to FIG. 11, a flow diagram that illustrates procedures for configuring the character input portion 500 during the manufacturing process is provided. As an initial step in the process, the character input portion 500 is substantially assembled, except for the character configuration (step 602). Accordingly, the character input portion proceeds through a manufacturing process such that all electrical and mechanical components are properly assembled, which includes the housing 502, the various keys, such as the character input keys 504, a circuit board having the microcontroller 550, the internal memory 560, and the host cable 566, for example. That is, the internal memory 560 is positioned within the housing 502 and the housing 502 is sealed. At this step of the manufacturing process, however, the character identifiers 540 are not provided and no configuration code or key mapping configuration is programmed into the internal memory 560. As an alternative, a default configuration code may be preprogrammed into the internal memory 560 prior to assembly.

Once the character input portion is substantially assembled, a specific character configuration for the character input portion 500 is determined (step 604). In accordance with the above discussion, the character configuration may be associated with various countries, such as the United States, France, Germany, and Japan, or the character configuration may relate to specific languages or cultures, for example. A serial interface to the character input portion is then enabled (step 606). The general purpose of the serial interface is to provide an electrical coupling with the character input portion 500, and the electrical coupling may be through the host cable 566. Furthermore, the serial interface may be with a programming unit. It should be noted that, while a serial interface is employed with this example of the invention in order to provide a low cost implementation, any type of suitable communication interface, including any type of parallel interface, may be used with various alternate examples of the invention.

Returning now to FIG. 11, following enablement of the serial interface, a scan is performed for the internal memory 560 (step 608). If it is determined that the internal memory 560 is present (step 610), then the configuration code and the key mapping configuration associated with the selected character configuration are programmed into the internal memory 560 (step 612). More specifically, the configuration code is programmed into the configuration code area 562 and the key mapping configuration is programmed into the key mapping configuration area 564. In some embodiments, the internal memory 560 is EEPROM having a storage capacity of 128 bytes. The first byte that is read from the internal memory 560 may be reserved for the configuration code (i.e., the first byte may be the configuration code area 562), and the remaining bytes of the internal memory 560 may be reserved for the key mapping configuration (i.e., the remaining bytes may be the key mapping configuration area 564). Once the internal memory 560 is programmed with the configuration code (by the programming unit, for example), the serial interface is disabled (step 614). Character identifiers 540 associated with the selected character configuration are then applied to the exterior of the character input portion 500 (step 616). Applying the character identifiers 540 may involve applying labels, or may involve printing the character identifiers 540.

Referring to step 610 in the flow diagram of FIG. 11, situations may arise where the internal memory 560 is not present. The game console may associate a default configuration code with those character input portions 500 that do not include the internal memory 560. If no internal memory 560 is present, therefore, the serial interface is disabled (step 614) and character identifiers 540 associated with the default configuration code are applied to the exterior of the character input portions 500. This permits the character input portion 500 to incorporate one less component for some markets, such as those markets where a relatively high volume of character input portions 500 are distributed.

The above discussion provided the process by which the various character configurations of the character input portions 500 may be configured. Once the character configurations are properly programmed into the internal memory 560, the user may operatively connect the character input portion 500 to the game console 102, which may be accomplished by connecting the character input portion 500 to the game controller portion 400.

Figure 12:
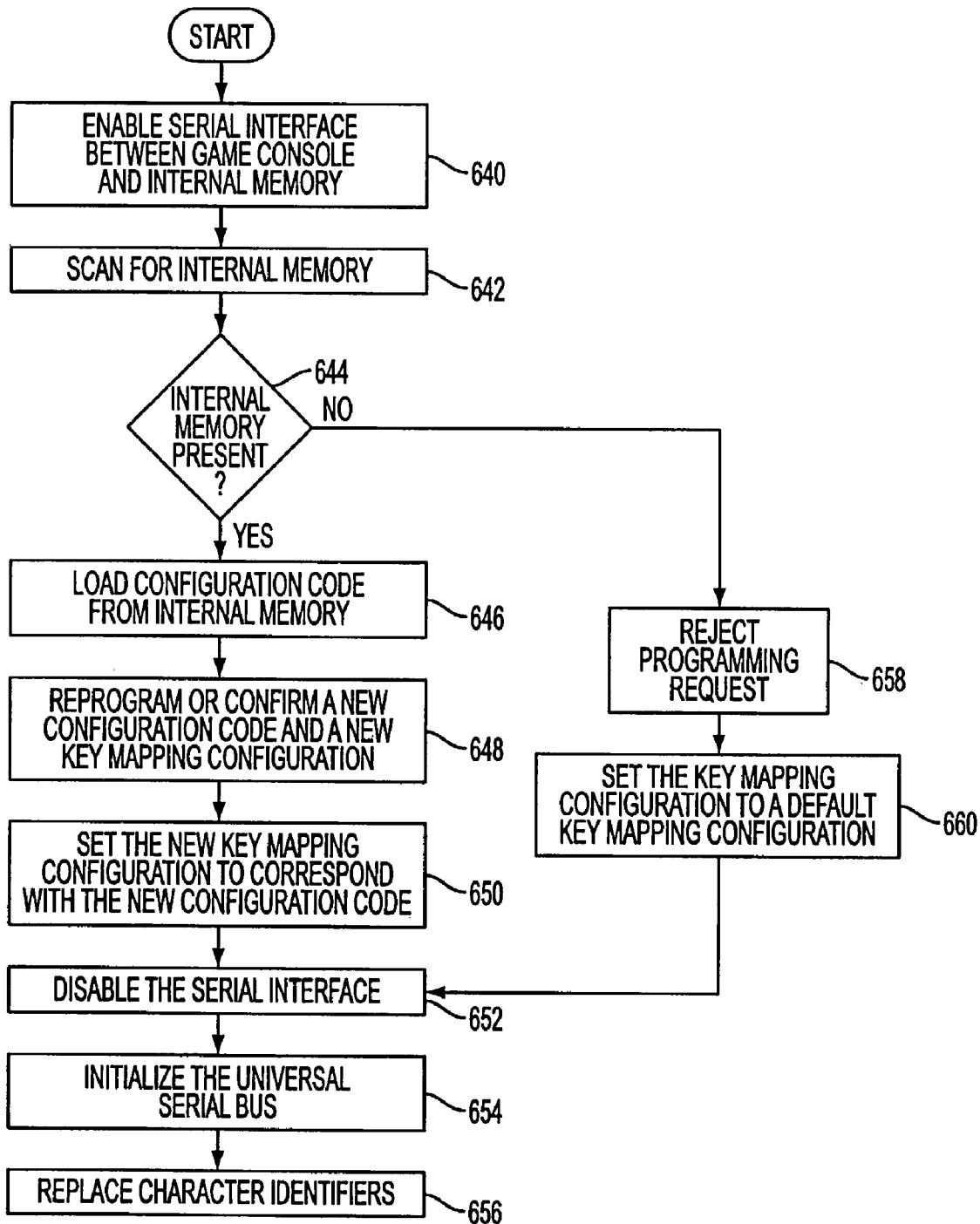
FIG. 12 is a second flow diagram that illustrates another procedure for configuring the character input portion to have a character configuration.

Character input portion 500 may also be reconfigured by the user to change the character configuration. Referring to FIG. 12, a flow diagram that illustrates a procedure for configuring the character input portion 500 by the user is provided. Initially, a serial interface is enabled between the game console 102 and the internal memory 560 (step 640). The game console 102 then scans the character input portion 500 for the internal memory 560 (step 642). When the internal memory 560 is present (step 644), the game console 102 loads the configuration code from the internal memory 560 (step 646). If the configuration code loaded from the internal memory 560 is different than the configuration code the user intends to input, then the internal memory 560 is reprogrammed with a new configuration code and a new key mapping configuration (step 648). If, however, the configuration code loaded from the internal memory 560 is not different than the configuration code the user intends to input, then the original configuration code is confirmed and no changes are made in step 648. Accordingly, the step 648 includes determining whether the original configuration code is different than the new configuration code. The new key mapping configuration is then set to correspond with the new configuration code (step 650), the serial interface between the game console 102 and the internal memory 560 is disabled (step 652), and the USB is initialized (step 654) for use during game play. Finally, the user replaces the character identifiers 540 associated with the original character configuration with the character identifiers 540 associated with the new character configuration (step 656). Replacing the character identifiers 540 may involve removing the pre-existing character identifiers 540 and adding labels to the character input portion 500. Replacing the character identifiers 540 may also involve placing labels over the pre-existing character identifiers 540.

Referring to step 644 in the flow diagram of FIG. 12, situations may again arise where the internal memory 560 is not present. If the internal memory 560 is not present in the character input portion 500, then the game console rejects the reprogramming request (step 658) and a default key mapping configuration is associated with the character input portion 500 (step 660). Accordingly, a character input portion 500 that does not include the internal memory 560 may not generally be reconfigured. The user may, however, be able to manually modify the key mapping configuration through the interface with the game console 102.

In order to facilitate reconfiguration of the configuration code and the key mapping configuration, the game console 102 may display a graphical user interface on a display device that guides the user through the steps 640-646. Accordingly, the graphical user interface may present a selection of options for the configuration code and the key mapping configuration, which may be based upon the location, language, or culture for which the character configuration intended. Following selection of the character configuration, the game console 102 will reprogram the character input portion 500 and may provide instructions for replacing or otherwise applying the character identifiers 540.

Based upon the above discussion, the character configuration of the character input portion 500 may be configured during the manufacturing process or reconfigured by the user. In general, the character configuration may be altered through two general steps: First, the character code is programmed into the internal memory. Second, the character identifiers are replaced.

Additional Considerations

The character input portion 500 may also be configured to include a read only memory that stores key mapping configuration for all character configurations. In utilizing the character input device 500, the configuration code will be parsed against the key mapping configuration table to set the key mapping configuration. Accordingly, configuring or reconfiguring the character input portion 500 may be accomplished by merely rewriting the configuration code.

The general processes, discussed above, for configuring the character input portion 500 during manufacturing or reconfiguring the character input portion 500 by the user utilize a structure wherein the key mapping configuration is stored within the internal memory 560. Alternately, a key mapping configuration table and all possible key mapping configurations may be stored within the game console 102. The game console 102 may then read the configuration code from the internal memory 560 and find a corresponding key mapping configuration from the key mapping configuration table. The game console 102 may then utilize the corresponding key mapping configuration to interpret signals from the character input portion 500 that correspond with activations of the character input keys 504.

The process for configuring the character input portion 500 is disclosed above in the context of the gaming system 100. The present invention, however, may be applied to a keyboard that is utilized with a personal computer, for example. Accordingly, the keyboard may be substantially manufactured, except for the provision of a configuration code and character identifiers for the various keys on the keyboard. Once the destination country, for example, is determined, the configuration code may be programmed and the character identifiers may be added. Similarly, a user may reprogram the configuration code to change the character configuration.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A method of manufacturing a game controller, the method comprising steps of:
   forming a game controller portion comprising at least one user interaction mechanism, the game controller portion comprising a unified main body having protruding members that form a pair of grips, the pair of grips extending from the main body in a generally common direction, the pair of grips for being employed by a user to grasp the game controller portion during use and defining an open space directly therebetween, the game controller portion further comprising an electrical connector in the main body thereof generally adjacent the space defined by the pair of grips, the electrical connector being a memory unit slot configured to accept a memory unit to provide additional and portable memory storage for game play;

encasing a rewritable memory device within a housing of the game controller;

forming a character input portion;

connecting the character input portion to the game controller portion so that the character input portion can be removed from the game controller portion, the character input portion when coupled to the game controller portion entirely residing between the pair of grips and within the open space defined by the pair of grips, and being electrically coupled to the memory unit slot of the game controller portion, the character input portion as coupled to the game controller portion physically abutting the pair of grips and the main body of the game controller portion in a generally continuous manner without substantial gaps between the character input portion and the game controller portion, the physically abutted pair of grips and main body of the game controller portion assisting in securing the coupled character input portion to the game controller portion;

inputting a configuration code into the rewritable memory; and programming a key mapping configuration that corresponds with the configuration code into the rewritable memory device, wherein the key mapping configuration determines which character is input when a character input key is activated.

2. The method recited in claim 1, further including a step of providing the character input portion with character identifiers that correspond with the key mapping configuration.

3. The method recited in claim 2, wherein the step of providing includes selecting the key mapping configuration and character identifiers to correspond with a particular language.

4. The method recited in claim 1, wherein the step of encasing includes selecting the memory device to be electrically erasable programmable read only memory.

5. The method recited in claim 1, wherein the step of programming includes selecting the key mapping configuration to correspond with a particular language.

6. The method recited in claim 1, wherein the step of programming includes enabling a serial interface with the input device.

7. The method recited in claim 1, further including a step of configuring the input device to interface with a game console.

8. The method recited in claim 1, further including a step of providing the input device with a plurality of activatable keys for inputting characters.

9. A method of reconfiguring an assembled input device having a plurality of keys and an internal memory, the method comprising steps of:

forming a game controller portion comprising at least one user interaction mechanism, the game controller portion comprising a unified main body having protruding members that form a pair of grips, the pair of grips extending from the main body in a generally common direction, the pair of grips for being employed by a user to grasp the game controller portion during use and defining an open space directly therebetween, the game controller portion further comprising an electrical connector in the main body thereof generally adjacent the space defined by the pair of grips, the electrical connector being a memory unit slot configured to accept a memory unit to provide additional and portable memory storage for game play encasing a rewritable memory device within a housing of the game controller;

forming a character input portion;

connecting the character input portion to the game controller portion so that the character input portion can be removed from the game controller portion, the character input portion when coupled to the game controller portion entirely residing between the pair of grips and within the space defined by the pair of grips, and being electrically coupled to the memory unit slot of the game controller portion, the character input portion as coupled to the game controller portion physically abutting the pair of grips and the main body of the game controller portion in a generally continuous manner without substantial gaps between the character input portion and the game controller portion, the physically abutted pair of grips and main body of the game controller portion assisting in securing the coupled character input portion to the game controller portion;

connecting the input device to a game console;

obtaining a second configuration code that replaces a first configuration code;

obtaining a second key mapping configuration that corresponds with the second configuration code; and enabling the game console to read the second configuration code and, responsive to reading the second configuration code, replacing using at the game console the second key mapping configuration in place of a first key mapping configuration corresponding to the first configuration code to determine which character is input when a character input key is activated with a second key mapping configuration.

10. The method recited in claim 9, further including a step of providing the input device with character identifiers that correspond with the second key mapping configuration.

11. The method recited in claim 10, wherein the step of providing the input device with the character identifiers includes selecting the character identifiers to correspond with a particular language.

12. The method recited in claim 10, wherein the step of providing the input device with the character identifiers includes applying a second set of labels over a first set of labels.

13. The method recited in claim 9, wherein the step of connecting the character input portion to the game controller includes enabling a serial interface between the game console and the input device.

14. The method recited in claim 9, wherein the step of reprogramming includes determining whether the first configuration code is different than the second key configuration code.

15. The method recited in claim 9, wherein the step of obtaining a second key mapping configuration includes selecting the second key mapping configuration to correspond with a particular language.

16. A game controller for a gaming console, comprising:

a game controller portion comprising at least one user interaction mechanism, the game controller portion further comprising a unified main body having protruding members that form a pair of grips, the pair of grips extending from the main body in a generally common direction, the pair grips for being employed by a user to grasp the game controller portion during use and defining an open space directly therebetween, the game controller portion further comprising an electrical connector in the main body thereof generally adjacent the space defined by the pair of grips, the electrical connector being a memory unit slot configured to accept a memory unit to provide additional and portable memory storage for game play a character input portion that is detachably connected to the game controller portion and that comprises:
  (i) a plurality of character input keys;
  (ii) a rewritable memory device having a configuration code area for storing a first configuration code that identifies a first character configuration for the plurality of character input keys; and
a connection for electrically connecting the rewritable memory device to the gaming console to download a second configuration code from the gaming console,
the character input portion when coupled to the game controller portion entirely residing between the pair of grips and within the space defined by the pair of grips, and being electrically coupled to the memory unit slot of the game controller portion, the character input portion as coupled to the game controller portion physically abutting the pair of grips and the main body of the game controller portion in a generally continuous manner without substantial gaps between the character input portion and the game controller portion, the physically abutted pair of grips and main body of the game controller portion assisting in securing the coupled character input portion to the game controller portion.

17. The input devices recited in claim 16, further including for the character input portion a first plurality of character identifiers associated with the character input keys, the character identifiers being replaceable with a second plurality of character identifiers.

18. The input devices recited in claim 16, wherein for the character input portion the rewritable memory device is electrically erasable programmable read only memory.

19. The method of claim 9, wherein the step of connecting the input device to a game console further includes physically coupling the character input portion to a handheld controller, coupled to the game console and shaped to interface with hands of a user.

20. The input devices of claim 16, further including the character input portion being shaped to secure to a handheld game controller portion.

21. The input devices of claim 20, wherein the character input portion further includes angled side surfaces configured to abut the handheld game controller portion between grips of the controller.

* * * * *